United States Patent
Lewis

(10) Patent No.: US 11,168,570 B1
(45) Date of Patent: Nov. 9, 2021

(54) COOLING ARRANGEMENT FOR GAS TURBINE ENGINE COMPONENTS

(71) Applicant: Raytheon Technologies Corporation, Farmington, CT (US)

(72) Inventor: Scott D. Lewis, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/004,662

(22) Filed: Aug. 27, 2020

(51) Int. Cl.
F01D 5/18 (2006.01)
F01D 25/12 (2006.01)
F01D 5/20 (2006.01)

(52) U.S. Cl.
CPC ............. F01D 5/186 (2013.01); F01D 25/12 (2013.01); F01D 5/20 (2013.01); F05D 2230/90 (2013.01); F05D 2240/122 (2013.01); F05D 2240/304 (2013.01); F05D 2260/201 (2013.01); F05D 2260/202 (2013.01); F05D 2260/22141 (2013.01)

(58) Field of Classification Search
CPC ........ F01D 11/001; F01D 5/186; F01D 25/12; F01D 5/187; F05D 2240/11; F05D 2260/22141
See application file for complete search history.

(56) References Cited

U.S. PATENT DOCUMENTS

| | | | |
|---|---|---|---|
| 4,515,523 A | 5/1985 | North et al. | |
| 5,243,759 A * | 9/1993 | Brown | B22C 9/10 29/889.721 |
| 5,368,441 A * | 11/1994 | Sylvestro | F01D 5/187 416/97 R |
| 6,234,754 B1 * | 5/2001 | Zelesky | B22C 9/10 416/97 R |
| 6,969,230 B2 * | 11/2005 | Shi | F01D 5/187 415/115 |
| 7,452,186 B2 * | 11/2008 | Charbonneau | F01D 5/187 416/97 R |
| 8,882,461 B2 | 11/2014 | Morris et al. | |
| 9,366,144 B2 | 6/2016 | Zess et al. | |
| 10,100,645 B2 | 10/2018 | Lewis et al. | |
| 10,337,332 B2 | 7/2019 | Auxier et al. | |
| 10,508,552 B2 * | 12/2019 | Auxier | F01D 5/18 |
| 10,830,054 B2 * | 11/2020 | Auxier | F01D 25/12 |
| 2007/0041835 A1 * | 2/2007 | Charbonneau | F01D 5/187 416/97 R |
| 2009/0246011 A1 | 10/2009 | Itzel | |
| 2014/0044555 A1 | 2/2014 | Lewis et al. | |

(Continued)

Primary Examiner — Eldon T Brockman
(74) Attorney, Agent, or Firm — Carlson, Gaskey & Olds, P.C.

(57) ABSTRACT

An airfoil for a gas turbine engine according to an example of the present disclosure includes, among other things, at least one of an airfoil section and a platform section including a wall. The wall includes a plurality of pedestals having adjacent pedestals extending from an external wall surface to establish a respective cooling passage, and the cooling passage includes an inlet and an outlet. The adjacent pedestals are dimensioned such that the adjacent pedestals taper inwardly from the inlet in a first direction towards the outlet to establish a throat in the respective cooling passage. A method of fabricating a gas turbine engine component is also disclosed.

20 Claims, 12 Drawing Sheets

(56) References Cited

U.S. PATENT DOCUMENTS

2014/0112799 A1\* 4/2014 Lee ................. F01D 5/187
 416/97 R
2016/0245097 A1 8/2016 Jones et al.

\* cited by examiner

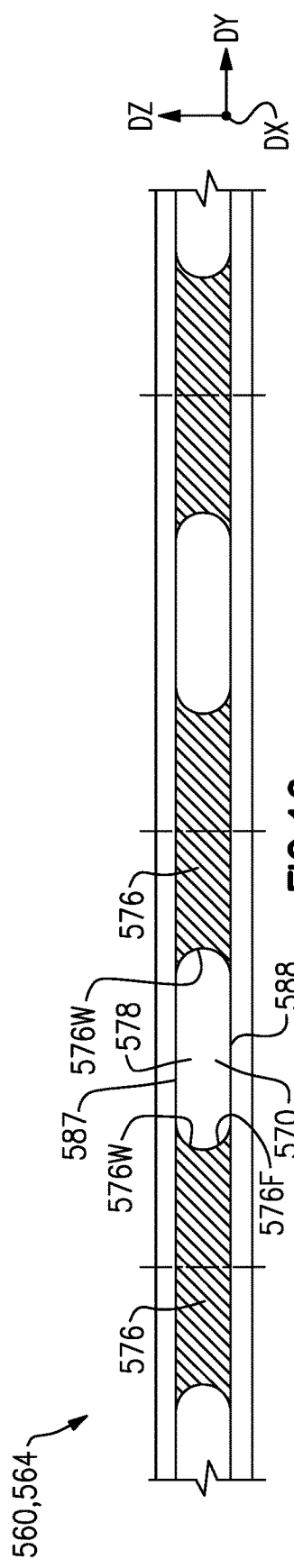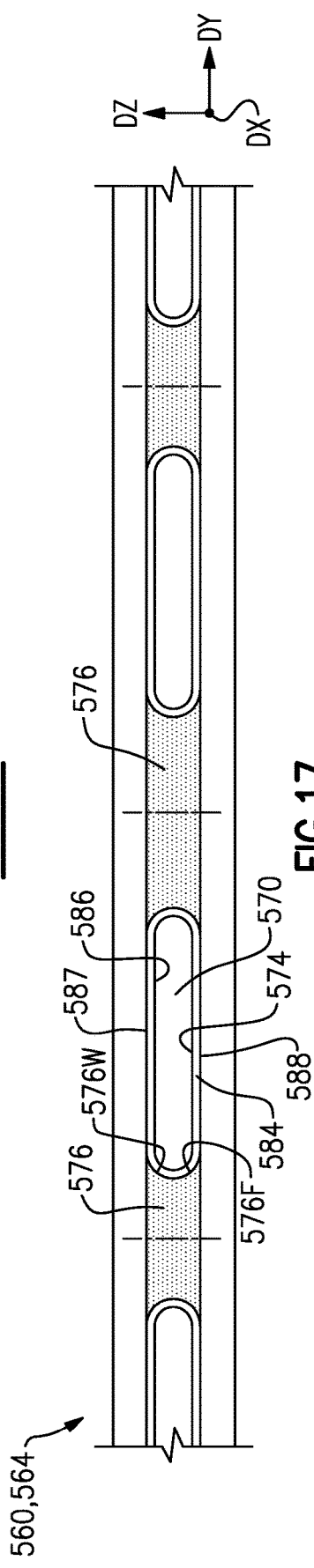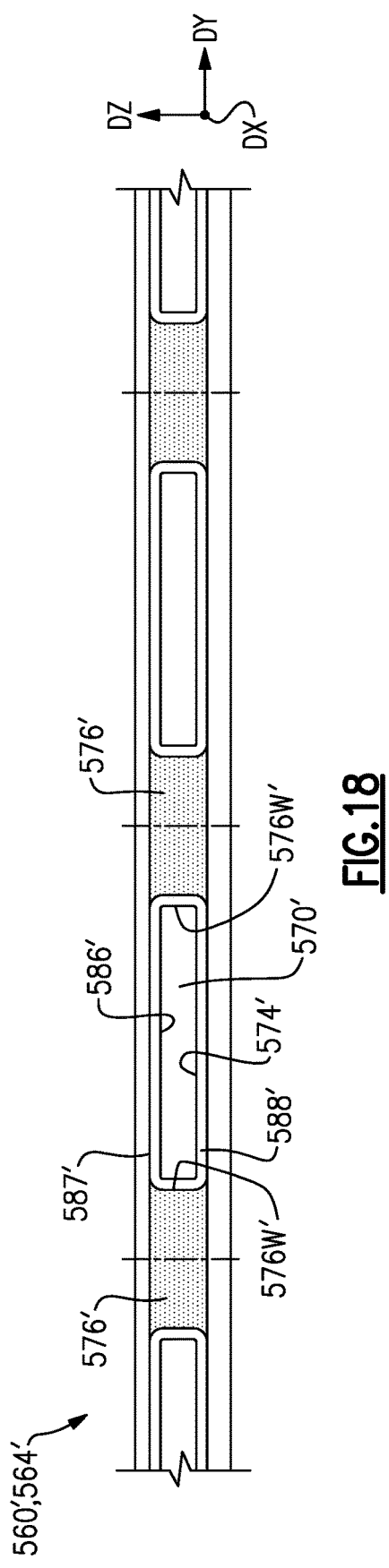

COOLING ARRANGEMENT FOR GAS TURBINE ENGINE COMPONENTS

BACKGROUND

This disclosure relates to cooling for a component, such as a component of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion. The blades and vanes are subject to extreme heat, and thus cooling schemes are utilized for each.

Some cooling schemes may employ cooling holes that communicate cooling flow to adjacent portions of the blades or vanes. Surfaces of the blades or vanes may include a coating.

SUMMARY

An airfoil for a gas turbine engine according to an example of the present disclosure includes an airfoil section extending in a radial direction from a platform section, extending in a chordwise direction between a leading edge and a trailing edge, and extending in a thickness direction between a pressure side and a suction side that join together at the leading and trailing edges. At least one of the airfoil section and the platform section include a wall. The wall extends between an internal wall surface and an external wall surface, and the internal wall surface bounds an internal cavity. The wall includes a plurality of pedestals having adjacent pedestals extending from the external wall surface to establish a respective cooling passage, and the cooling passage includes an inlet and an outlet. The inlet is coupled to the internal cavity along the internal wall surface, and the outlet along the external wall surface. The adjacent pedestals are dimensioned such that the adjacent pedestals taper inwardly from the inlet in a first direction towards the outlet to establish a throat in the respective cooling passage, and the respective passage expands outwardly from the throat in the first direction towards the outlet to establish a diffusion section interconnecting the throat and the outlet, and one or more coatings along the external wall surface and into the outlet to establish a coated outlet region of the cooling passage. A minimum cross-sectional area of the cooling passage along the coated outlet region is divided by a cross-sectional area of the throat establishes a coated area ratio, and the coated area ratio is greater than or equal to 0.8.

In a further embodiment of any of the foregoing embodiments, each of the adjacent pedestals comprises a ceramic or metallic material, and the one or more coatings comprise a ceramic and/or a metallic material.

In a further embodiment of any of the foregoing embodiments, the outlet is established adjacent to the trailing edge.

In a further embodiment of any of the foregoing embodiments, no other pedestals are situated between facing walls of the adjacent pedestals bounding the cooling passage at the throat.

In a further embodiment of any of the foregoing embodiments, facing walls of the adjacent pedestals are substantially parallel along a first length of the cooling passage between the throat and the diffusion section and are substantially parallel along a second length of the cooling passage between the diffusion section and the outlet.

In a further embodiment of any of the foregoing embodiments, the coated area ratio is less than or equal to 1.3.

In a further embodiment of any of the foregoing embodiments, each of the adjacent pedestals extends along a respective longitudinal axis. The longitudinal axes of the adjacent pedestals establish a pitch. The adjacent pedestals establish a first width across the throat. A ratio of the first width to the pitch is greater than or equal to 0.25 and is less than or equal to 0.65.

In a further embodiment of any of the foregoing embodiments, each of the adjacent pedestals extends along a respective longitudinal axis and along a respective reference plane bisecting the adjacent pedestals along the respective longitudinal axis. A first cross-sectional area is established along the external wall surface at the outlet of the respective cooling passage, and the first cross-sectional area defined between the reference planes of the adjacent pedestals and between opposed faces bounding the respective cooling passage spanning between facing walls of the adjacent pedestals. One minus a ratio of a cross-sectional area of the coated outlet region along the outlet of the respective cooling passage is divided by the first cross-sectional area defines a blockage ratio, and the blockage ratio is greater than or equal to 0.35.

In a further embodiment of any of the foregoing embodiments, the coated area ratio is greater than or equal to 0.9 and less than or equal to 1.15.

In a further embodiment of any of the foregoing embodiments, opposed faces of the wall extend between the adjacent pedestals to bound the cooling passage, and the opposed faces establish a first height at the outlet. A ratio of an average thickness of the one or more coatings along the opposed faces at the outlet divided by the first height is less than or equal to 0.20.

In a further embodiment of any of the foregoing embodiments, the facing walls of the adjacent pedestals are filleted along at least a portion of the cooling passage between the inlet and outlet.

A gas turbine engine according to an example of the present disclosure includes an array of blades and an array of vanes spaced axially from the array of blades in a gas path. The array of blades are rotatable in the gas path. An array of blade outer air seals (BOAS) are arranged about the array of blades to bound the gas path. At least one of the array of blades and the array of BOAS includes an external wall between an internal wall surface and an external wall surface. The internal wall surface bounds an internal cavity. A plurality of pedestals are established in a thickness of the external wall. The plurality of pedestals includes pairs of adjacent pedestals extending from the external wall surface to establish respective cooling passages, and each of the cooling passages includes an inlet and an outlet. The inlet coupled to the internal cavity along the internal wall surface, and the outlet along the external wall surface. The adjacent pedestals are dimensioned such that the respective cooling passage establishes a throat and a diffusion section interconnecting the throat and the outlet, and one or more coatings along the external wall surface and into the outlet to establish a coated outlet region of the respective cooling passage. A minimum cross-sectional area of the respective cooling passage along the coated outlet region is divided by a cross-sectional area of the throat establishes a coated area ratio, and the coated area ratio is greater than or equal to 0.8.

In a further embodiment of any of the foregoing embodiments, the one or more coatings comprise a ceramic and/or metallic material.

In a further embodiment of any of the foregoing embodiments, an airfoil section comprises the external wall. The airfoil section extends in a thickness direction between pressure and suction sides and extending in a chordwise direction between leading and trailing edges. The outlet is established along the trailing edge.

In a further embodiment of any of the foregoing embodiments, the adjacent pedestals are dimensioned such that the respective cooling passage tapers inwardly from the inlet towards the outlet to establish the throat. Facing walls of the adjacent pedestals are substantially parallel along a first length of the respective cooling passage between the throat and the diffusion section and are substantially parallel along the coated outlet region. The coated area ratio is less than or equal to 1.3.

In a further embodiment of any of the foregoing embodiments, no other pedestals are situated between the facing walls of the adjacent pedestals bounding the cooling passage at the throat. Each of the adjacent pedestals extends along a respective longitudinal axis. The longitudinal axes of the adjacent pedestals establish a pitch. The adjacent pedestals establish a first width across the throat, and wherein a ratio of the first width to the pitch is greater than or equal to 0.25 and is less than or equal to 0.65.

A method of fabricating a gas turbine engine component according to an example of the present disclosure includes establishing an internal cooling cavity bounded by an external wall, and establishing a cooling passage between adjacent pedestals in the external wall. The adjacent pedestals extend from an external wall surface of the external wall to establish an outlet of the cooling passage, and the cooling passage including an inlet coupled to the internal cavity. The adjacent pedestals are dimensioned such that the cooling passage tapers inwardly from the inlet in a first direction towards the outlet to establish a throat, and expands outwardly from the throat in the first direction towards the outlet to establish a diffusion section interconnecting the throat and the outlet forming one or more coatings along the external wall surface and into the outlet to establish a coated outlet region of the cooling passage. A minimum cross-sectional area of the cooling passage along the coated outlet region divided by a cross-sectional area of the throat establishes a coated area ratio, and the coated area ratio is greater than or equal to 0.8 and is less than or equal to 1.3.

In a further embodiment of any of the foregoing embodiments, one or more coatings comprise a ceramic and/or metallic material.

In a further embodiment of any of the foregoing embodiments, the gas turbine engine component is an airfoil including an airfoil section extending in a radial direction from a platform section, extending in a chordwise direction between a leading edge and a trailing edge, and extending in a thickness direction between a pressure side and a suction side that join together at the leading and trailing edges. The outlet is established along the trailing edge.

In a further embodiment of any of the foregoing embodiments, no other pedestals are situated between facing walls of the adjacent pedestals bounding the cooling passage at the throat. The facing walls of the adjacent pedestals are substantially parallel along a first length of the cooling passage between the throat and the diffusion section and are substantially parallel along the coated outlet region.

The various features and advantages of this invention will become apparent to those skilled in the art from the following detailed description of an embodiment. The drawings that accompany the detailed description can be briefly described as follows.

BRIEF DESCRIPTION OF THE DRAWINGS

FIG. 3A illustrates a selected region of the component of FIG. 3.

FIG. 16 illustrates a sectional view of a component including a cooling arrangement according to another example.

FIG. 17 illustrates another sectional view of the component of FIG. 16.

FIG. 18 illustrates an end view of a cooling arrangement according to another example.

DETAILED DESCRIPTION

Figure 1:
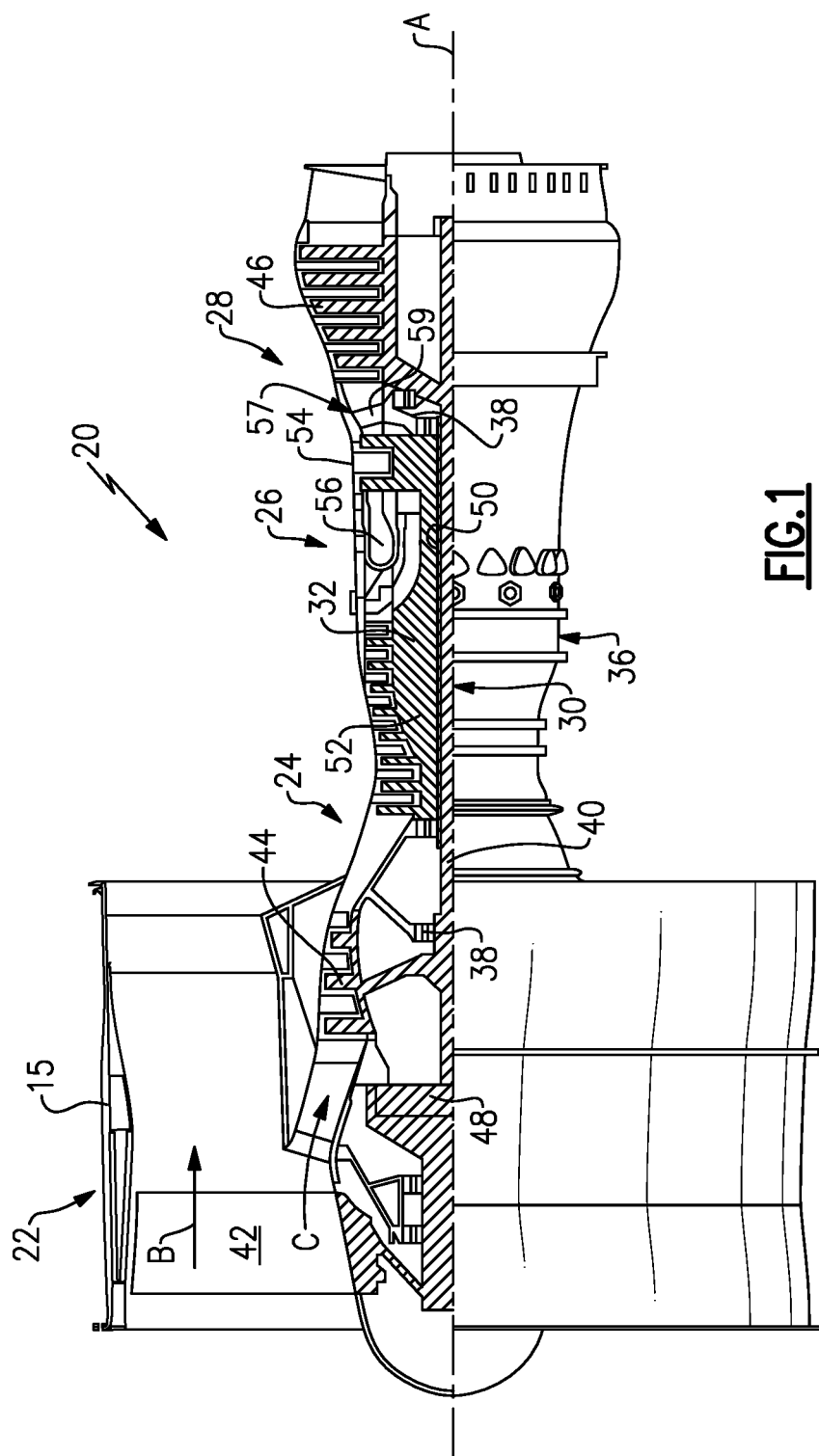
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
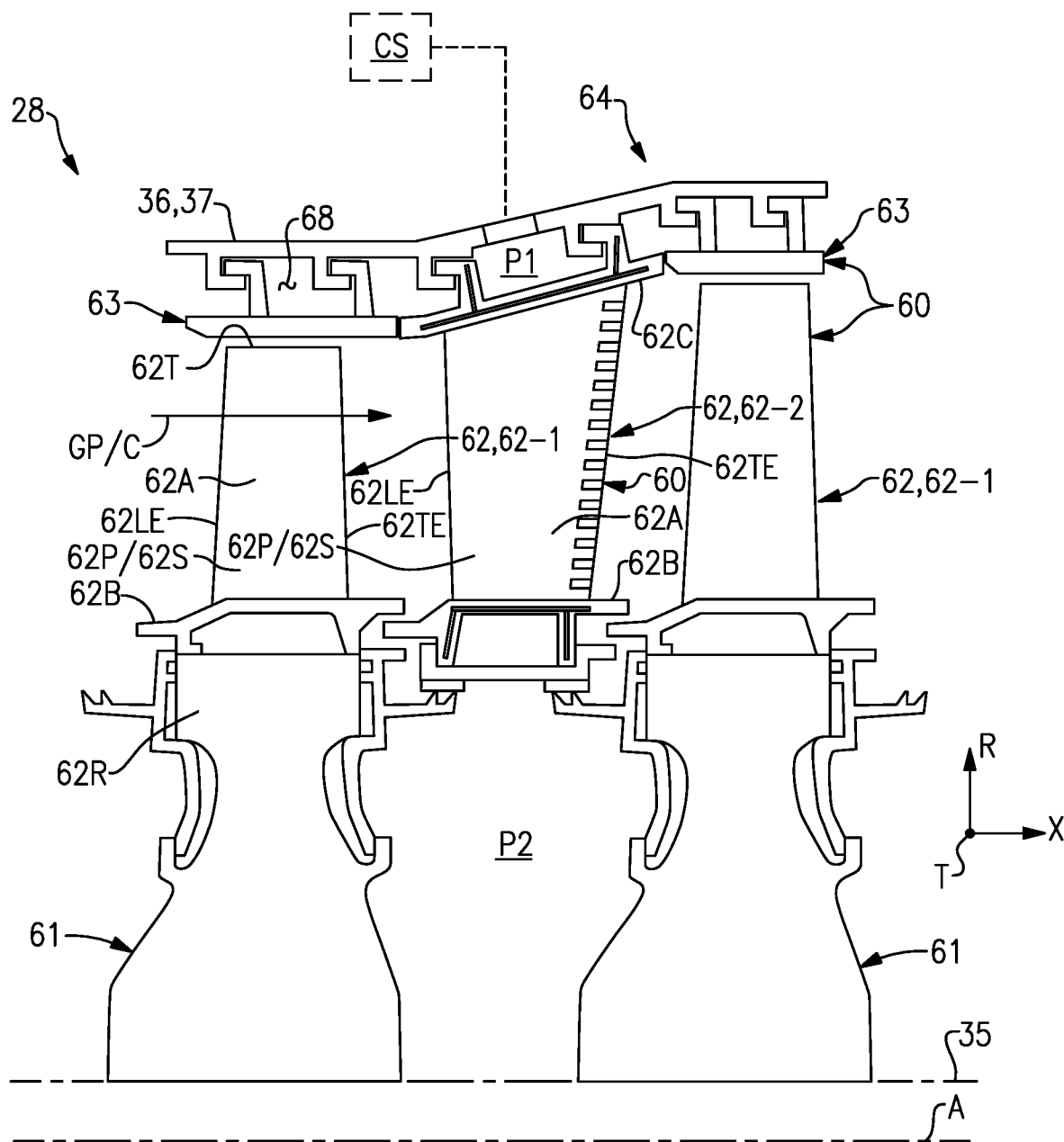
FIG. 2 schematically shows an airfoil arrangement.

FIG. 2 illustrates an exemplary section of a gas turbine engine, such as the turbine section 28 of FIG. 1. Although the disclosure primarily refers to the turbine section 28, it should be understood that other portions of the engine 20 can benefit from the teachings disclosed herein, including airfoils in the compressor section 24 and combustor panels or liners in the combustor section 26, and other portions of the engine 20 that may be subject to elevated temperature conditions during engine operation. Other systems can benefit from the teachings disclosed herein, including gas turbine engines and other systems lacking a fan for propulsion. In this disclosure, like reference numerals designate like elements where appropriate and reference numerals with the addition of one-hundred or multiples thereof designate modified elements that are understood to incorporate the same features and benefits of the corresponding original elements.

The turbine section 28 includes a plurality of components 60 arranged relative to the engine axis A, including a rotor 61, one or more airfoils 62, and one or more blade outer air seals (BOAS) 63. Example airfoils 62 include blades 62-1 and vanes 62-2. The rotor 61 is coupled to a rotatable shaft 35 (shown in dashed lines for illustrative purposes). The shaft 35 can be one of the shafts 40, 50 of FIG. 1, for example. The rotor 61 carries one or more blades 62-1 that are rotatable about the engine axis A in a gas path GP, such as the core flow path C.

Each airfoil 62 includes an airfoil section 62A extending in a spanwise or radial direction R from a first platform 62B. In the illustrative example of FIG. 2, each blade 62-1 extends in the radial direction R from the platform 62B to a tip 62T, and each vane 62-2 extends in the radial direction R from the first (e.g., inner) platform 62B to a second (e.g., outer) platform 62C. The platforms 62B, 62C bound or define a portion of the gas path GP. The airfoil section 62A generally extends in a chordwise or axial direction X between a leading edge 62LE and a trailing edge 62TE, and extends in a circumferential or thickness direction T between pressure and suction sides 62P, 62S. The pressure and suction sides 62P, 62S are joined at the leading and trailing edges 62LE, 62TE. The root section 62R of the blade 62-1 is mounted to, or integrally formed with, the rotor 61. The vane 62-2 can be arranged to direct or guide flow in the gas path GP from and/or towards the adjacent blade(s) 62-1.

Each BOAS 63 can be spaced radially outward from the tip 62T of the blade 62-1. The BOAS 63 can include an array of seal arc segments that are circumferentially distributed or arranged in an annulus about an array of the airfoils 62 to bound the gas path GP.

The turbine section 28 includes at least one array of airfoils 62, including at least one array of blades 62-1 and at least one array of vanes 62-2, and at least one array of BOAS 63 arranged circumferentially about the engine axis A. The array of vanes 62-2 are spaced axially from the array of blades 62-1 relative to the engine axis A. The tips 62T of the blades 62-1 and adjacent BOAS 63 are arranged in close radial proximity to reduce the amount of gas flow that escapes around the tips 62T through a corresponding clearance gap.

The turbine section 28 includes a cooling arrangement 64 for providing cooling augmentation to the components 60 during engine operation. The cooling arrangement 64 includes one or more cooling cavities or plenums P1, P2 defined by a portion of the engine static structure 36 such as the engine case 37. The plenum P2 can be at least partially defined or bounded by a rotatable portion of the engine 20, such as the rotor 61. One or more cooling sources CS (one shown) are configured to provide cooling air to the plenums P1, P2. The plenums P1, P2 are configured to receive pressurized cooling flow from the cooling source(s) CS to cool portions of the airfoils 62 and/or BOAS 63. Cooling sources CS can include bleed air from an upstream stage of the compressor section 24 (FIG. 1), bypass air, or a secondary cooling system aboard the aircraft, for example. Each of the plenums P1, P2 can extend in a circumferential or thickness direction T between adjacent airfoils 62 and/or BOAS 63.

FIGS. 3-6 illustrate an exemplary gas turbine engine component 160 including a cooling arrangement 166. The component 160 can be a combustion liner incorporated into the combustor section 26, or a BOAS 63 or airfoil 62 such as a blade 62-1 or vane 62-2 incorporated into the turbine section 28 of FIGS. 1 and 2, for example. In the illustrative example of FIG. 3, the component 160 is an airfoil 162 shown as a blade 162-1. The blade 162-1 can be a turbine blade incorporated into one or more rows of the turbine section 28, for example.

Figure 3:
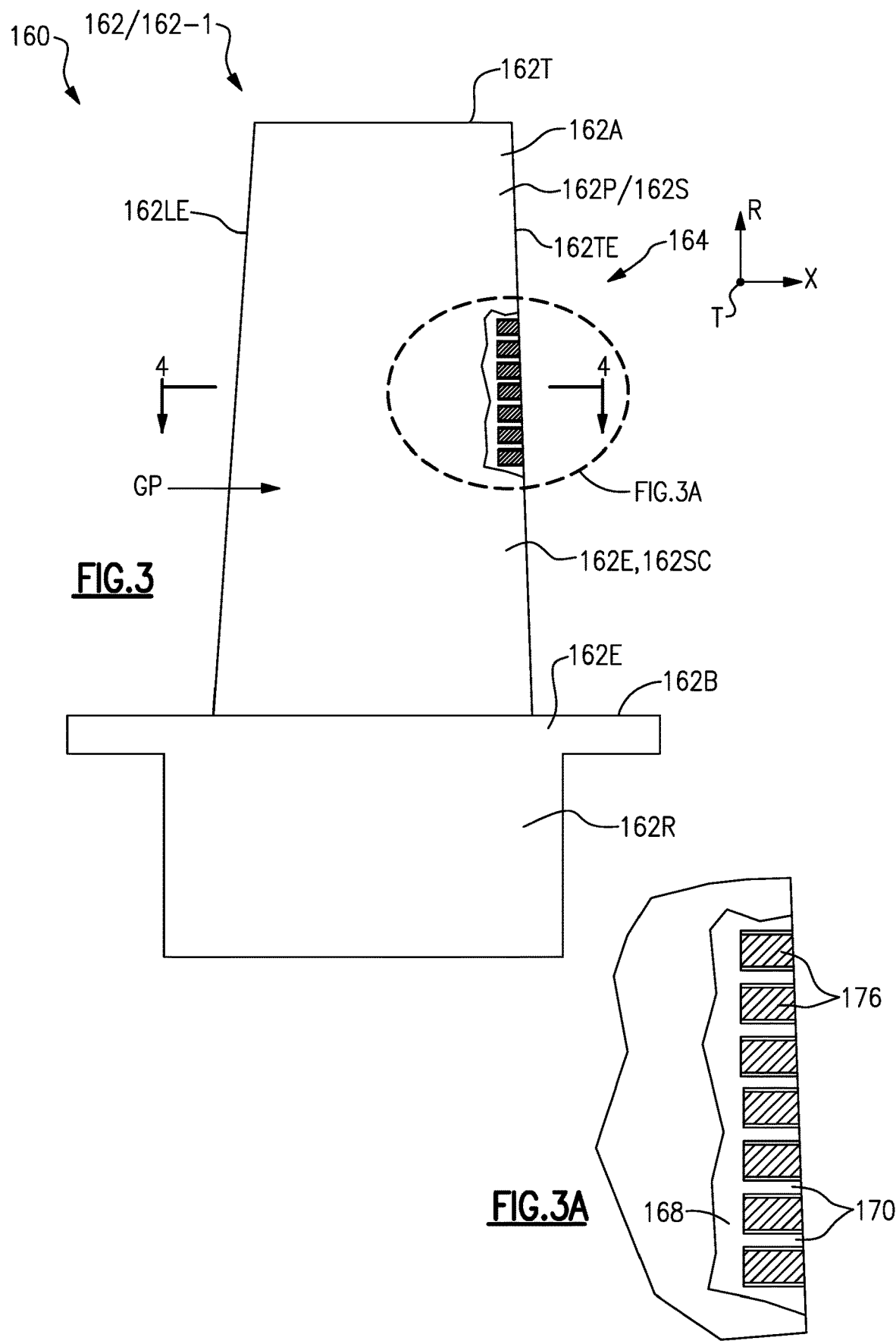
FIG. 3 illustrates a side view of an exemplary component including a cooling arrangement.
Figure 4:
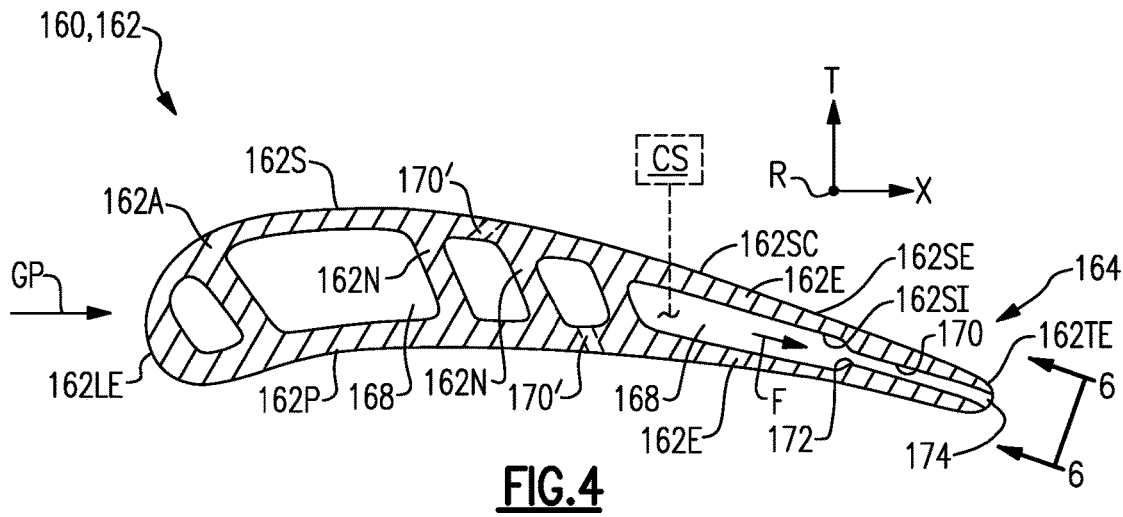
FIG. 4 illustrates a sectional view taken along line 4-4 of FIG. 3.

Referring to FIGS. 3-4, the airfoil 162 includes an airfoil section 162A extending in a radial direction R from a platform section 162B (FIG. 3). The airfoil section 162A extends in a chordwise direction X between a leading edge 162LE and a trailing edge 162TE. The airfoil section 162A extends in a thickness direction T between a pressure side 162P and a suction side 162S. The pressure and suction sides 162P, 162S are joined together at the leading and trailing edges 162LE, 162TE, as illustrated in FIG. 4. The airfoil 162 can include one or more external walls 162E and one or more internal walls 162N (FIG. 4) defined within a thickness of the airfoil section 162A and/or platform section 162B. Surfaces along the external walls 162E of the airfoil section 162A and the platform(s) 162B establish an external surface contour 162SC that interacts with gases in a gas path GP during operation, such as the core flow path C of FIGS. 1-2.

The component 160 can be made of various materials including metallic, composite and/or non-metallic materials. Example metallic materials include high temperature metals or alloys, such as nickel-based super alloy. Single crystal and directionally solidified metallic materials can be utilized. The component 160 can be made of a ceramic or ceramic matrix composite (CMC) material formed from one or more layers of a CMC layup.

Referring to FIG. 4, with continuing reference to FIG. 3, the external wall 162E extends between an external wall surface 162SE and another opposed external wall surface 162SE and/or internal wall surface 162SI. In the illustrated example of FIG. 4, the airfoil section 162A includes external walls 162E that establish the external surface contour 162SC.

The component 160 defines one or more plenums or internal cavities 168 in a thickness of the airfoil section 162A or another portion of the component 160. Each of the cavities 168 can be fluidly coupled to a coolant source CS (shown in dashed lines for illustrated purposes). The cavities 168 can serve as impingement cavities and/or feeding cavities for receiving cooling flow F from the coolant source CS. Each internal wall surface 162SI can bound one of the internal cavities 168.

The component 160 defines one or more cooling passages 170 for cooling portions of the component 160 (see also FIG. 3A). At least some of the cooling passages 170 are defined in the external wall(s) 162E. Each of the cooling passages 170 extends between a respective inlet 172 and outlet 174. The cooling passage 170 can convey cooling flow F to provide cooling augmentation to adjacent portions of the component 160.

Figures 5, 6:
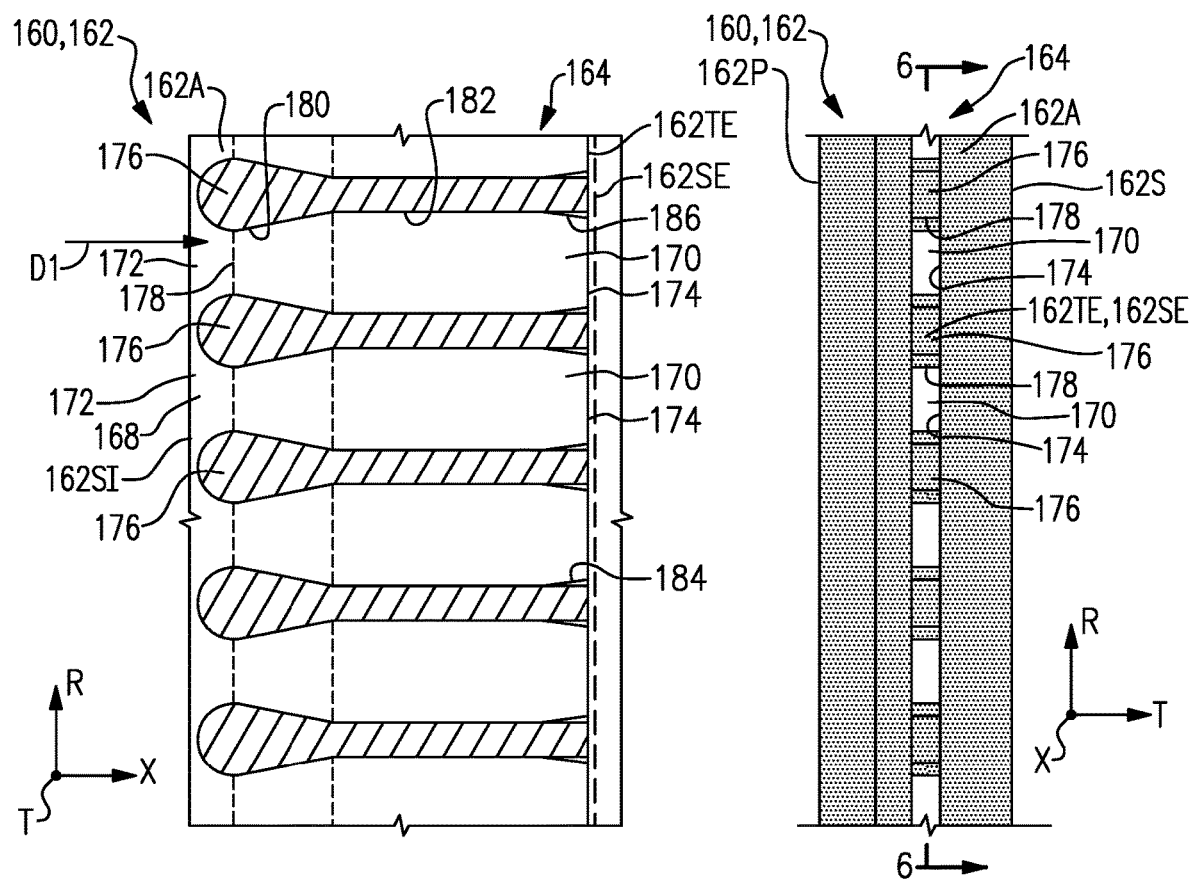
FIG. 5 illustrates an end view of the component taken from line 5-5 of FIG. 4.
FIG. 6 illustrates a sectional view taken along line 6-6 of FIG. 5.

In the illustrative example of FIGS. 4 and 5, one or more (or each) of the outlets 174 are established adjacent to and along the trailing edge 162TE. In examples, the outlet 174 is established at a position along the external wall surface 162SE at a distance of less than about 5.0 percent of a chord length established between the leading and trailing edges 162LE, 162TE. For purposes of this disclosure, the terms "about," "approximately" and "substantially" mean±3% of the stated value or relationship unless otherwise indicated. It should be understood that one or more of the outlets 174 can be established along other portions of the airfoil section 162A, the platform 162B, and other portions of the component 160 that may benefit from cooling augmentation. Other exemplary locations of passages 170' are shown in dashed lines in FIG. 4 for illustrative purposes.

Referring to FIGS. 5-6, with continued reference to FIGS. 3-4, the component 160 can include one or more transfer (or augmentation) features 176 in a wall of the component 160, such as the external wall(s) 162E. In the illustrative example of FIGS. 5-6, the transfer features 176 are pedestals dimensioned to span between opposed walls of the component 160. Other exemplary transfer features can include turbulators such as trip strips, bulges and dimples. The pedestals 176 can be arranged in a row with respect to the radial direction R, as illustrated by FIGS. 5-6, or in another orientation.

Referring to FIG. 6, with continuing reference to FIG. 5, the pedestals 176 are established in a thickness of the external wall 162E and are arranged in directly adjacent pairs to establish respective cooling passages 170 therebetween. In the illustrative example of FIGS. 5-6, pairs of directly adjacent pedestals 176 extend from the external wall surface 162SE to an opposed internal wall surface 162SI to establish respective cooling passages 170. Each inlet 172 can be coupled to the internal cavity 168 along the internal wall surface 162SI. The outlet 174 can be established along the external wall surface 162SE such as along the trailing edge 162TE, as illustrated by FIGS. 5-6. In the illustrative example of FIG. 6, one or more cooling passages 170 established by the adjacent pedestals 176 are fluidly isolated between the inlet 172 and outlet 174 with respect to other directly adjacent cooling passage(s) 170.

The pedestals 176 can have various geometries to establish a profile of the respective cooling passages 170. In the illustrative example of FIG. 6, each of the pedestals 176 has generally spear-shaped geometry. It should be understood that other pedestal geometries can be utilized to establish the cooling passages including any of the geometries disclosed herein. Adjacent pedestals 176 are dimensioned such that the cooling passage 170 tapers inwardly from the inlet 172 in a first direction D1 towards the outlet 174 to establish a meter or throat 178 (shown in dashed lines for illustrative purposes, see also FIG. 5). The throat 178 establishes a minimum cross-sectional area along the cooling passage 170 between the inlet 172 and outlet 174, inclusive. The throat 178 is established a distance from the outlet 174.

The adjacent pedestals 176 are dimensioned such that the cooling passage 170 expands outwardly from the throat 178 in the first direction D1 towards the outlet 174 to establish a diffusion section (or zone) 180 interconnecting the throat 178 and outlet 174. An entrance to the diffusion section 180 can be established at the throat 178, as illustrated in FIG. 6, or can be established a distance from the throat 178. The diffusion section 180 is dimensioned to convey diffused cooling flow F to the outlet 174. The outlet 174 can be dimensioned to eject or convey the diffused cooling flow F to various portions of the component 160 during operation, such as along the external wall surface 162SE of the component 160 to provide film cooling augmentation, for example.

The adjacent pedestals 176 can be dimensioned to establish a flat section (or zone) 182 between the diffusion section 180 and outlet 174. The cooling passage 170 can have a substantially constant cross-sectional area along the length of the flat section 182. The flat section 182 may reduce variation in dimensioning of the outlets 174 that may be otherwise caused by shifting or movement of a casting core during formation of the cooling arrangement 164. In other examples, the flat section 182 is omitted and the diffusion section 180 establishes the outlet 174, as illustrated by walls 276W' and diffusion section 280' of FIG. 7 (shown in dashed lines for illustrative purposes).

The component 160 can include one or more coatings 184 disposed or formed along various surfaces of the component 160. In the illustrative example of FIG. 6, at least one coating 184 is disposed along the external walls surface 162SE. At least one coating 184 is disposed into and along one or more of the outlets 174 to establish a coated outlet region 186 of the respective cooling passages 170 (coatings 184 show in dashed lines for illustrative purposes). The coated outlet region 186 interconnects the outlet 174 and upstream portions of the cooling passage 170 including the flat section 182 and diffusion section 180. A dimension of the throat 178 can be selected with respect to a predetermined thickness of the coating 184, such as an expected maximum and/or average thickness of the coating 184 associated with the coated outlet region 186. The throat 178 can be dimensioned to establish a minimum cross-sectional area of the coated cooling passage 170 such that the throat 178 meters cooling flow F through the cooling passage 170 in operation.

Various materials can be utilized for the coatings and transfer features disclosed herein, including metallic and/or non-metallic materials. Example metallic and non-metallic materials include any of the materials disclosed herein. The pedestals 176 can be made of a first material, and each coating 184 can be made of a second material. The second material can be the same or can differ from the first material in composition and/or construction. In examples, the external walls 162E and pedestals 176 of the component 160 are made of a ceramic material such as a ceramic matrix composite (CMC), and the coating(s) 184 are made of a metallic material. In examples, the coating(s) 184 are made of a ceramic material and/or metallic material. Each coating 184 can be established by one or more layers. Coating(s) 184 along the external surface 162SC can serve as a thermal barrier coating to at least partially insulate the component 160 from relatively hot gases in the gaspath GP (FIGS. 3-4) in operation. Thermal barrier coatings are known and can be utilized to provide resistance to oxidation and high-temperature corrosion.

Figure 7:
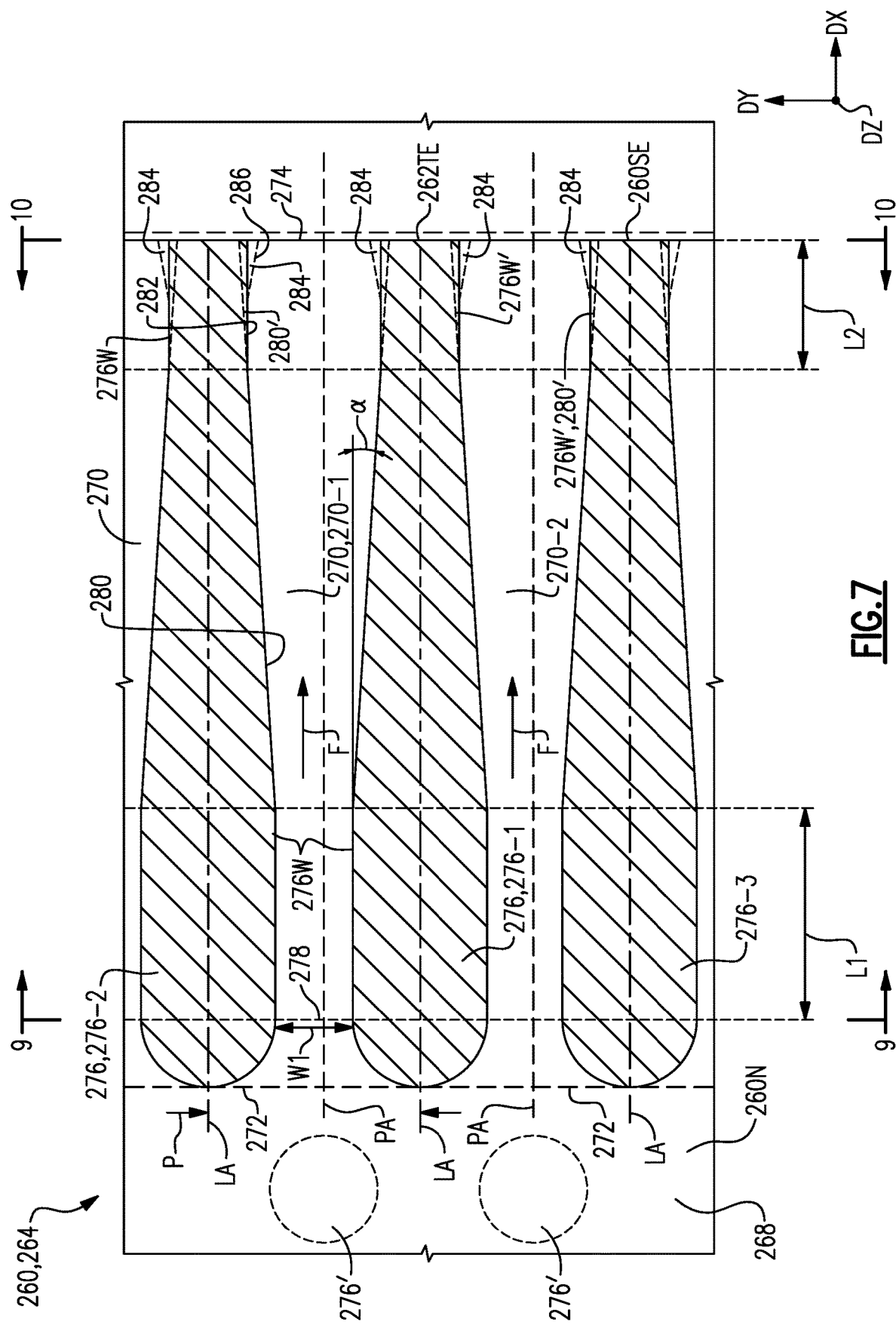
FIG. 7 illustrates a sectional view of a component including a cooling arrangement according to another example.
Figure 8:
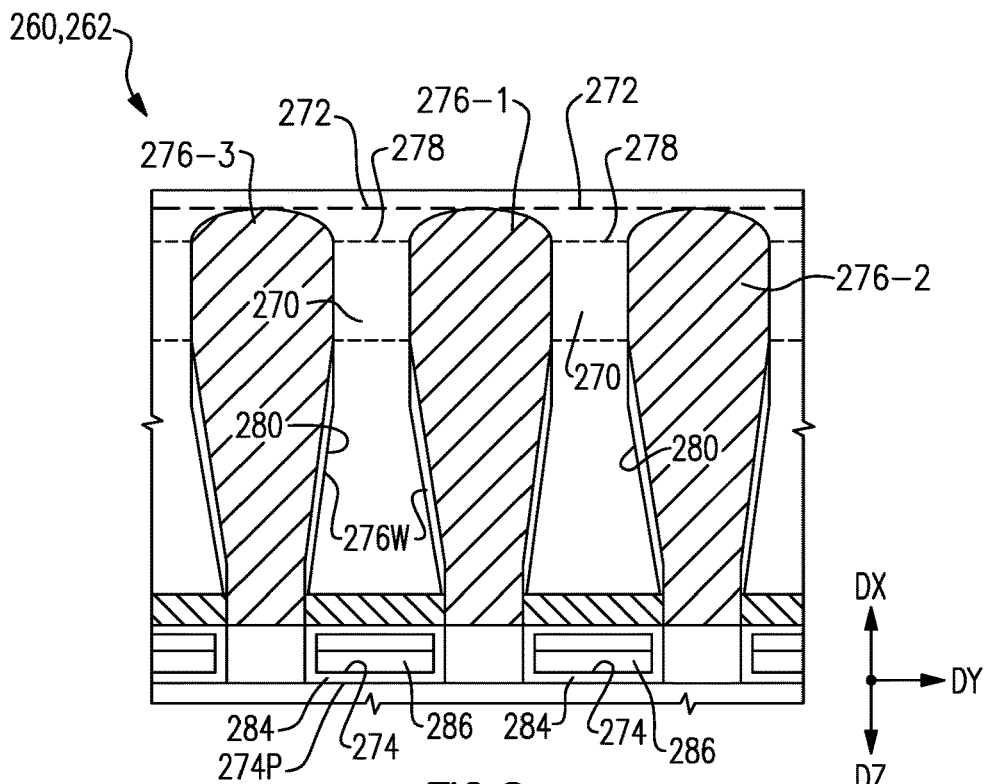
FIG. 8 illustrates a perspective view of the cooling arrangement of FIG. 7.

FIGS. 7-10 illustrate a gas turbine engine component 260 including a cooling arrangement 264 according to another example. The cooling arrangement 264 includes a plurality of transfer features 276 formed in a wall of the component 260, such as the external walls 62E, 162E of FIGS. 2 and 3-4. The component 260 can include an external wall surface 260SE and an internal wall surface 260SI (FIGS. 7-8). The internal and external wall surfaces 260SI, 260SE can establish portions of the internal and external wall surfaces 162SI, 162SE of the internal and external walls 162N, 162E of FIG. 4, for example.

Referring to FIG. 7, the component 260 includes at least one row of pedestals 276 that establish a row of cooling passages 270. The row of pedestals 276 and cooling passages 270 are distributed in a direction DY and are at least partially axially aligned in a direction DX perpendicular to a height of the pedestals 276 in a direction DZ. The directions DX, DY, DZ can correspond to the chordwise, radial and thickness directions X, R, T of FIGS. 3-6, for example. In the illustrative example of FIGS. 7-8 and 10, the pedestals 276 extend inwardly from the external wall surface 260SE of the component 260.

In the illustrative examples of FIGS. 7-10, three adjacent pedestals 276 are shown as first, second and third pedestals 276-1 276-2, 276-3. It should be understood that fewer or more than three adjacent pedestals 276 can be utilized to establish the cooling arrangement 264, such as only two adjacent pedestals 276. The first pedestal 276-1 is situated between, and is directly adjacent to, the second and third pedestals 276-2, 276-3 to establish a pair of cooling passages 270-1, 270-2 on opposed sides of the first pedestal 276-1. The first and second pedestals 276-1, 276-2 establish the cooling passage 270-1, and the first and third pedestals 276-1, 276-3 establish another cooling passage 270-2.

The component 260 can include one or more transfer features 276' axially spaced apart from the pedestals 276 with respect to the direction DX (shown in dashed lines for illustrative purposes). The transfer features 276' are arranged upstream of the pedestals 276 with respect to a general direction of flow F through the cooling arrangement 264. A geometry of the transfer features 276' can be the same or can differ from a geometry of the pedestals 276. For example, the transfer features 276' can be elliptical pedestals as illustrated in FIG. 7.

Figure 9:
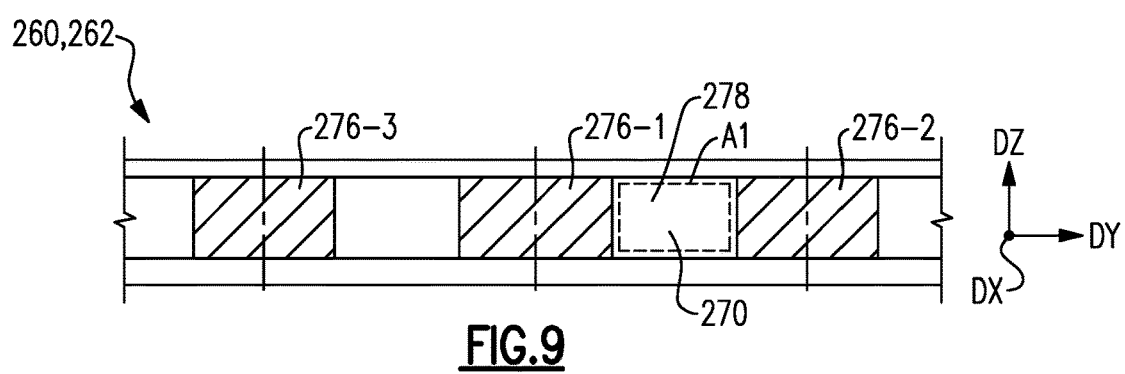
FIG. 9 illustrates a sectional view taken along line 9-9 of FIG. 7.
Figure 10:
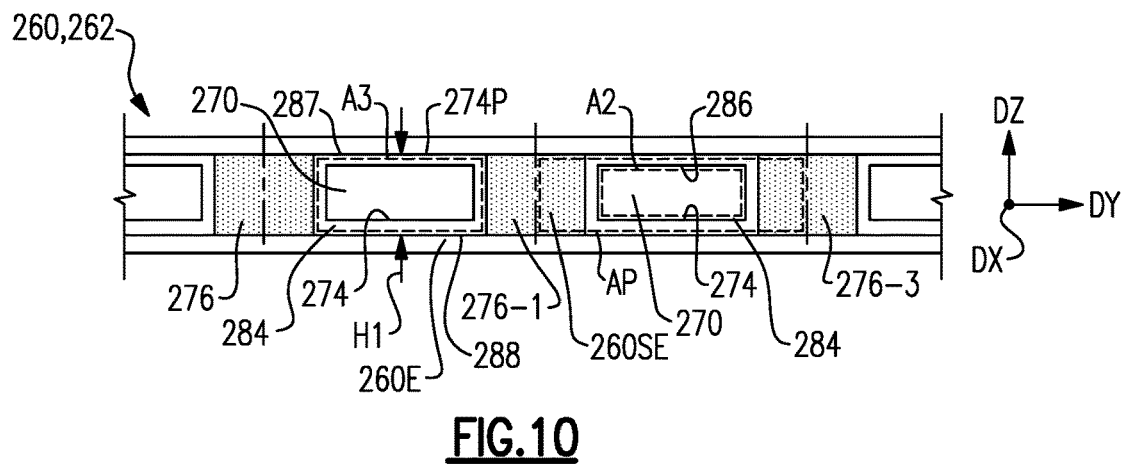
FIG. 10 illustrates an end view of the cooling arrangement taken relative to line 10-10 of FIG. 7.

Each cooling passage 270 extends along a respective passage axis PA between a respective inlet 272 and outlet 274. The inlet 272 and outlet 274 can have various geometries, such as a generally rectangular geometry as illustrated by FIGS. 9-10. The passage axes PA of two or more adjacent cooling passages 270 can be substantially parallel to one another, as illustrated in FIG. 7, or can be transverse to one another.

The pedestals 276 can have various geometries. In the illustrative example of FIGS. 7-8, the pedestals 276 have a substantially spear-shaped geometry. However, it should be understood that the pedestals 276 can have other geometries including any geometries disclosed herein.

Each pedestal 276 can be elongated and extend along a respective longitudinal axis LA that intersects opposed ends of the pedestal 276. The passage axis PA and/or longitudinal axis LA can have a major component in the direction DX, as illustrated in FIG. 7. The pedestals 276-1 to 276-3 can extend along respective reference planes REF1 to REF3 (FIGS. 9-10). The reference planes REF1 to REF3 are established along the respective longitudinal axes LA and bisect the respective pedestals 276-1 to 276-3, as illustrated by FIG. 7. The pedestals 276-1 to 276-3 can be substantially symmetrical along the respective reference planes REF1 to REF3, as illustrated by FIGS. 7-10.

The longitudinal axis LA of two directly adjacent pedestals 276 establish a respective pitch P (FIG. 7). The pitch P may be established with respect to the center of the adjacent pedestals 276 along the respective longitudinal axes LA. The two directly adjacent pedestals 276 establish a first width W1 across a throat 278 of the cooling passage 270. The pedestals 276 can be dimensioned such that a ratio of the first width W1 of the throat 278 to the pitch P is greater than or equal to about 0.25, or more narrowly above about 0.3 and less than or equal to about 0.65.

Facing walls 276W of the adjacent pedestals 276 can be contoured along the cooling passage 270. In the illustrative example of FIG. 7, the adjacent pedestals 276 are dimensioned such that the respective cooling passage 270 tapers inwardly in the direction DX from the inlet 272 towards the outlet 274 to establish the throat 278 at a position spaced apart from the inlet 272 and outlet 274 with respect to the passage axis PA. In other examples, the throat 278 is established at the inlet 272. The adjacent pedestals 276 are dimensioned such that the facing walls 276W are substantially parallel along a first length L1 of the cooling passage 270 between the throat 278 and diffusion section 280 to establish a metering section (or region 279 and are substantially parallel along a second length L2 of the cooling passage 270 between the diffusion section 280 and outlet 274, including along coated outlet region 286 (see also FIG. 8). In the illustrative example of FIGS. 7-9, no other pedestals are arranged between facing walls 276W of the adjacent pedestals 276 bounding the respective cooling passage 270, including at the throat 278. Dimensioning the pedestals 276 to have the metering section 279 may provide more relatively consistent flow between two or more components 260. In examples, the first length L1 is between 0.5-3.0 hydraulic diameters. A "hydraulic diameter" can be calculated as 4 times the flow area divided by the wetted perimeter of the cooling passage.

A thickness of each pedestal 276 can be dimensioned such that the pedestal 276 tapers along the longitudinal axis LA between the throat 278 and the outlet 274 to establish the diffusion section 280. Each of the walls 276W can slope from the first length L1 to establish an angle α. The angle α can be established with respect to a reference plane REFW extending along the first length L1 of the wall 276W. The reference plane REFW can be substantially parallel to the passage axis PA and/or longitudinal axis LA of the respective pedestal 276. The angle α is greater than 0 degrees to establish the diffusion section 280. In examples, the angle α is at least about 1 degree, or more narrowly is less than or equal to about 15 or 20 degrees. The angles α disclosed herein can be utilized to establish sufficient velocities of the cooling flow F which may more closely match a velocity of gases in the gas path GP (FIGS. 3-4). The diffusion section 280 can be utilized to provide sufficient cooling and reduce a likelihood of metering due to blockage at the outlet 274.

The component 260 can include one or more coatings 284 along and into one or more of the outlets 274 to establish respective coated outlet regions 286, as illustrated in FIGS. 7-8 and 10. In the illustrative example of FIGS. 8 and 10, the coating 284 is disposed along a perimeter 274P of the respective outlet 274. In the illustrative example of FIG. 7, one or more coatings 284 are disposed along at least a portion of the second length L2 of the cooling passage 270 to establish the respective coated outlet region 286. The coating 284 can taper in the direction DX from the respective outlet 274 towards the respective inlet 272. The pedestals 276 can be dimensioned such the throat 278 and diffusion section 280 are substantially or completely free of any thermal barrier (or other) coatings. One or more coatings 284' can be disposed along the external wall surface 260SE (284' shown in dashed lines in FIG. 7 for illustrative purposes).

Referring to FIGS. 9-10, a minimum cross-sectional area A1 of the cooling passage 270 is established along the throat 278 (A1 shown in dashed lines in FIG. 9 for illustrative purposes). A minimum cross-sectional area A2 of the cooling passage 270 along the coated outlet region 286 can be established at the outlet 274, for example (A2 shown in dashed lines in FIG. 10 for illustrative purposes). The minimum cross-sectional area A2 of the cooling passage 270 along the coated outlet region 286 divided by the cross-sectional area A1 of the throat 278 establishes a coated area ratio A2:A1. In examples, the coated area ratio A2:A1 is greater than or equal to about 0.8, or more narrowly less than or equal to about 1.3. The coated area ratio can be greater than or equal to 0.9, or more narrowly less than or equal to 1.15, such as about 1.0, for example.

The cooling arrangement 264 can be dimensioned to establish a relatively compact arrangement that provide sufficient rigidity of the component 260 and sufficient cooling flow ejected from the outlet 274. For example, referring to FIG. 10, opposed faces 287, 288 of the wall 260E span or otherwise extend between the facing walls 276W of the adjacent pedestals 276 to bound the cooling passage 270. The opposed faces 287, 288 establish a first height H1 at the outlet 274. In examples, a ratio of an average thickness of the coating 284 along the opposed faces 287, 288 at the outlet 274 divided by the first height H1 is less than or equal to 0.20. The second length L2 along the flat section 282 can be greater than the first height H1 such that the throat 278 is established upstream of the coated outlet region 286.

A relationship between the throat 278 and the outlet 274 excluding the coatings 284 be established. A cross-sectional area A3 can be established between the facing walls 276W and opposed faces 287, 288 along the outlet 274 (A3 shown in dashed lines in FIG. 10 for illustrative purposes). The cross-sectional area A3 along the outlet 274 divided by the cross-sectional area A1 of the throat 278 establishes an uncoated area ratio A3:A1. In examples, the uncoated area ratio A3:A1 is greater than or equal to about 1.2, or more narrowly less than or equal to about 2.0, such as about 1.4, about 1.6 or about 1.8. In examples, the cooling arrangement 264 is established such that a ratio of A2:A3 is greater than about 0.5, or more narrowly less than about 0.85.

The coated and uncoated area ratios A2:A1, A3:A1 can improve durability by establishing sufficient coating 284 thickness and cooling augmentation by the cooling passage 270, and can improve aerodynamics by establishing exit velocities of cooling flow F ejected by the outlet 274 to closely match velocities of gases in the gas path GP (FIGS. 3-4) to reduce losses that may be otherwise caused by mixing, turbulence, and flow separation, for example.

The pedestals 276 can be arranged relatively close which may increase structural rigidity along adjacent portions of the component 260. A cross-sectional area AP is established between the reference planes REF1, REF2 of the adjacent pedestals 276-1, 276-2 and opposed faces 287, 288 along an external wall surface 260SE of the component 260 (shown in dashed lines of FIG. 10 for illustrative purposes). The adjacent pedestals 276 and respective cooling passages 270 can be dimensioned such that one minus the cross-sectional area A2 of the coated outlet region 286 along the outlet 274 of the respective cooling passage 270-1 divided by the first cross-sectional area AP defines a blockage ratio (1−A2/AP). In examples, the blockage ratio (1−A2/AP) is greater than or equal to about 0.35, or more narrowly less than or equal to about 0.7, such as about 0.6. One or more (or each) adjacent pair of pedestals and one or more (or each) cooling passage can be dimensioned according to any of the ratios and other parameters disclosed herein.

Figure 11:
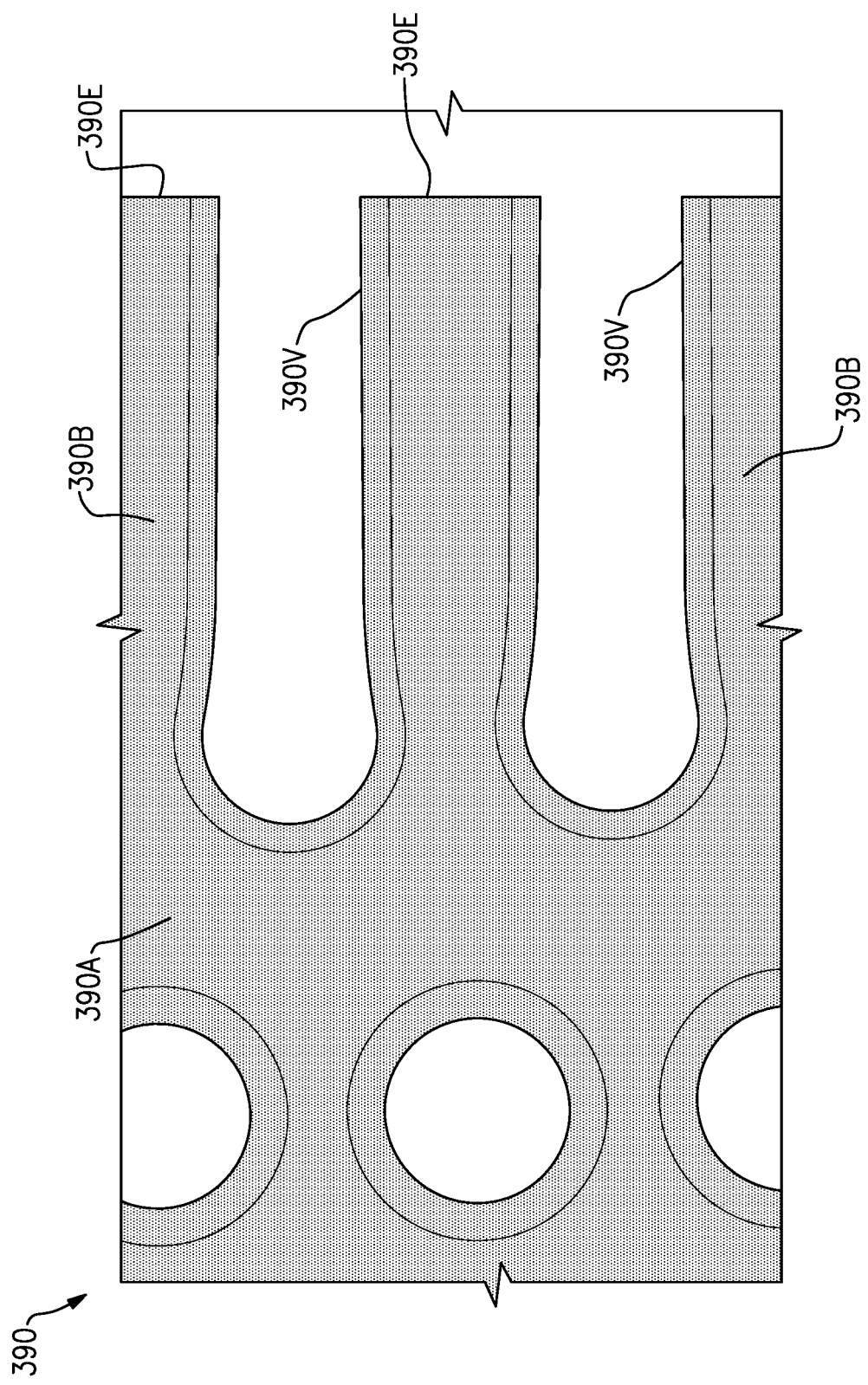
FIG. 11 illustrates an exemplary core for a component.

FIG. 11 illustrates an exemplary casting core 390 that can be utilized for establishing a cooling arrangement including any of the cooling arrangements disclosed herein. The core 390 can include a main body 390A and one or more branches 390B that extend outwardly from the main body 390A to a respective free end 390E. Adjacent branches 390B can establish a respective void 390V therebetween. A geometry of the voids 390V can correspond to a geometry of any of the transfer features or pedestals disclosed herein, and a geometry of the branches 390B can correspond to any of the cooling passages disclosed herein. The free ends 390E can correspond a geometry of any of the outlets disclosed herein, including outlets along a trailing edge of a corresponding airfoil. Various materials can be utilized to form the core 390, such as a refractory metal core (RMC) or ceramic core.

Figure 12:
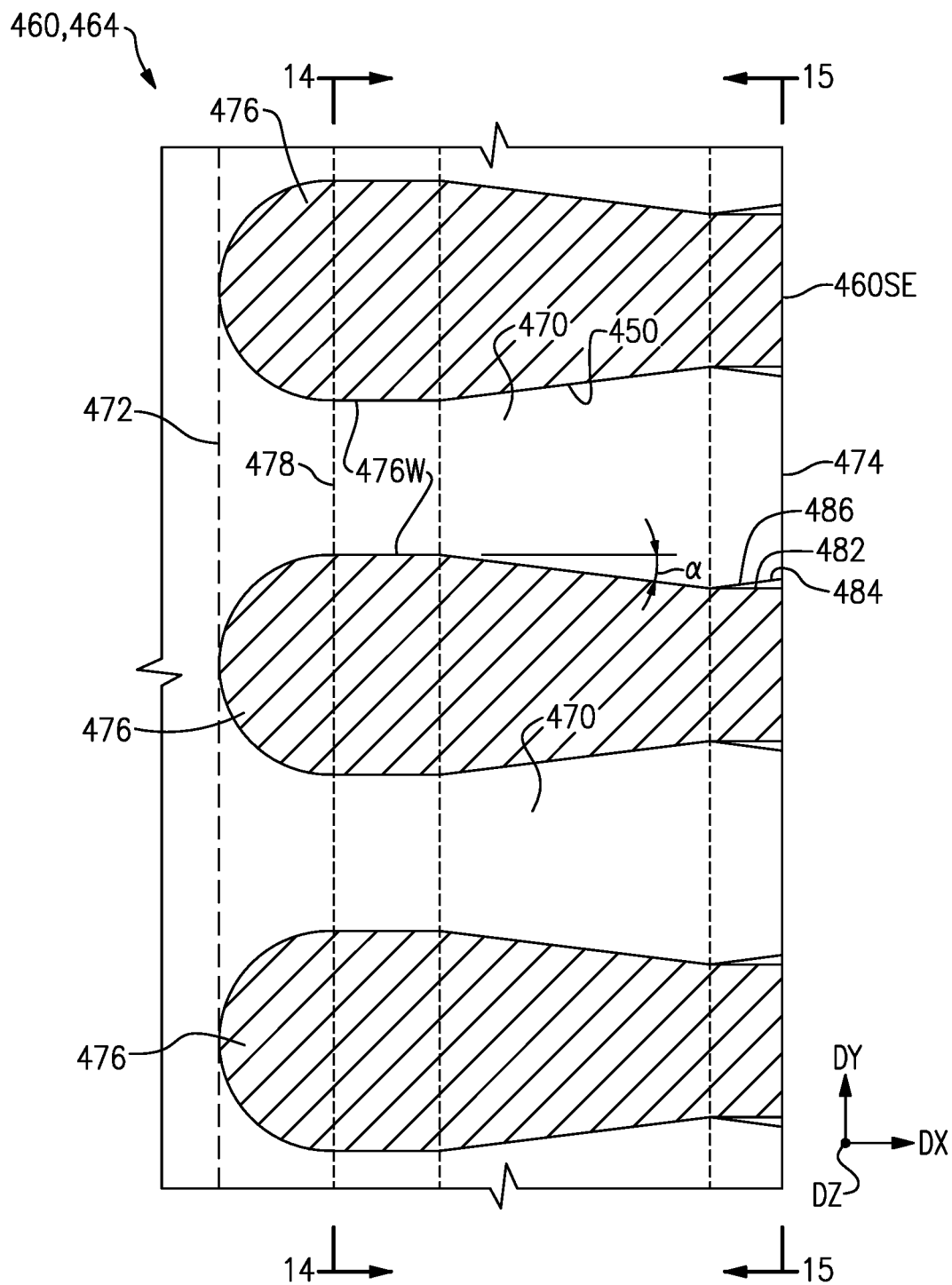
FIG. 12 illustrates a sectional view of a component including a cooling arrangement according to another example.
Figure 13:
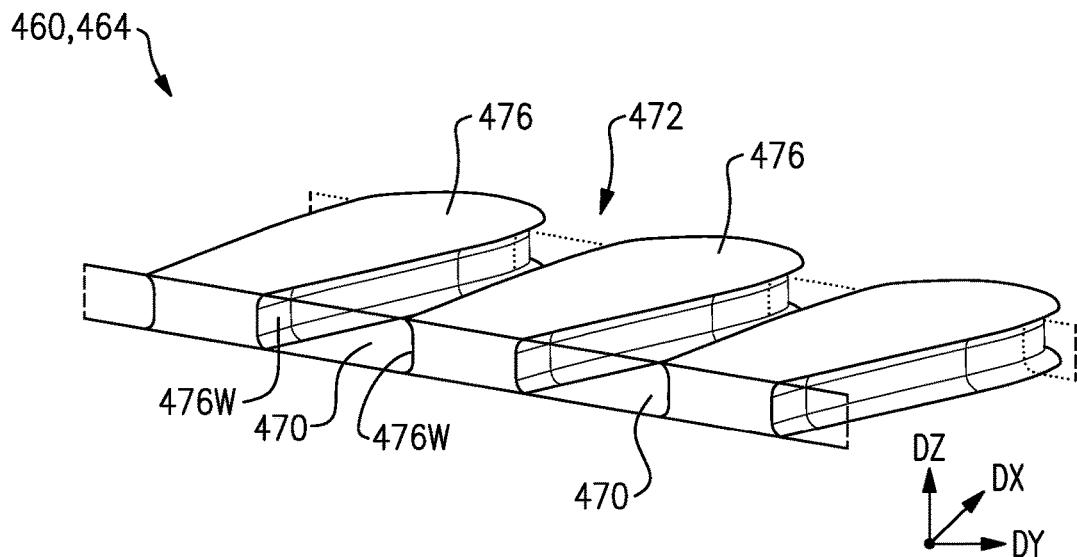
FIG. 13 illustrates a perspective view of the cooling arrangement of FIG. 12.
Figure 14:
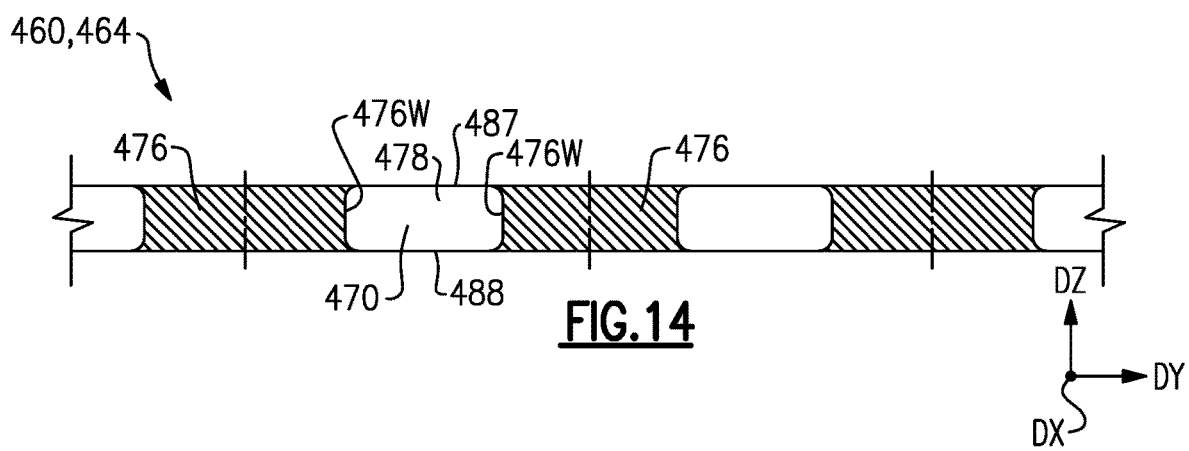
FIG. 14 illustrates a sectional view taken along line 14-14 of FIG. 12.
Figure 15:
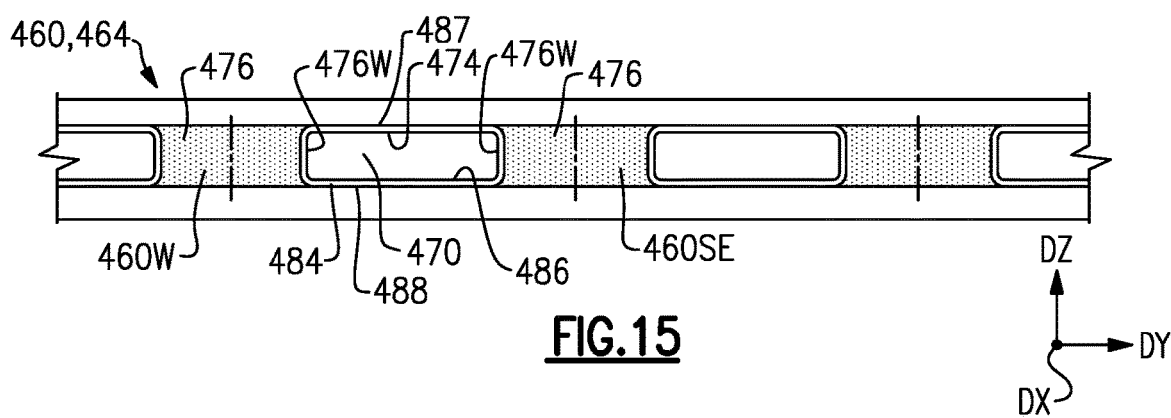
FIG. 15 illustrates an end view of the cooling arrangement taken relative to line 15-15 of FIG. 12.

FIGS. 12-15 illustrate a gas turbine engine component 460 including a cooling arrangement 464 according to another example. Facing walls 476W of adjacent pedestals 476 establish respective cooling passages 470. One or more coatings 484 can be disposed along at least a portion of the facing walls 476W, as illustrated in FIGS. 12 and 15. The coating 484 can extend at least a distance from external wall surface 460SE into the respective outlet 474 to establish coated outlet region 486, as illustrated in FIGS. 12 and 15. The coating 486 is omitted from FIG. 13 for illustrative purposes.

The facing walls 476W can be partially or completely filleted. In the illustrative example of FIGS. 13-15, surfaces of the facing walls 476W of the adjacent pedestal 476 are partially filleted along at least a portion of the cooling passage 470 between the inlet 472 and outlet 474. Partial fillets 476F establish junctions between the facing walls 476W and opposed faces 487, 488, as illustrated in FIGS. 13-15.

In the illustrative example of FIGS. 16-17, surfaces of facing walls 576W include full fillets 576F spanning between opposed faces 587, 588. A profile of each fillet 576F can be established by a respective radius. The partial and full fillets can be utilized to reduce localized stress concentrations in the component. The fillets may also improve filling of a respective core during formation of the cooling passages. Partial fillets may reduce weight as compared to full fillets. Full fillets may provide relatively lower stress concentrations with respect to partial fillets.

A geometry of the cooling passage 570 can differ at a throat 578 as compared to the respective outlet 574. For example, walls 576W' and opposed faces 587', 588' can be dimensioned to establish a substantially slot-shaped outlet 574', as illustrated by the cooling arrangement 564' of FIG. 18.

Figure 19:
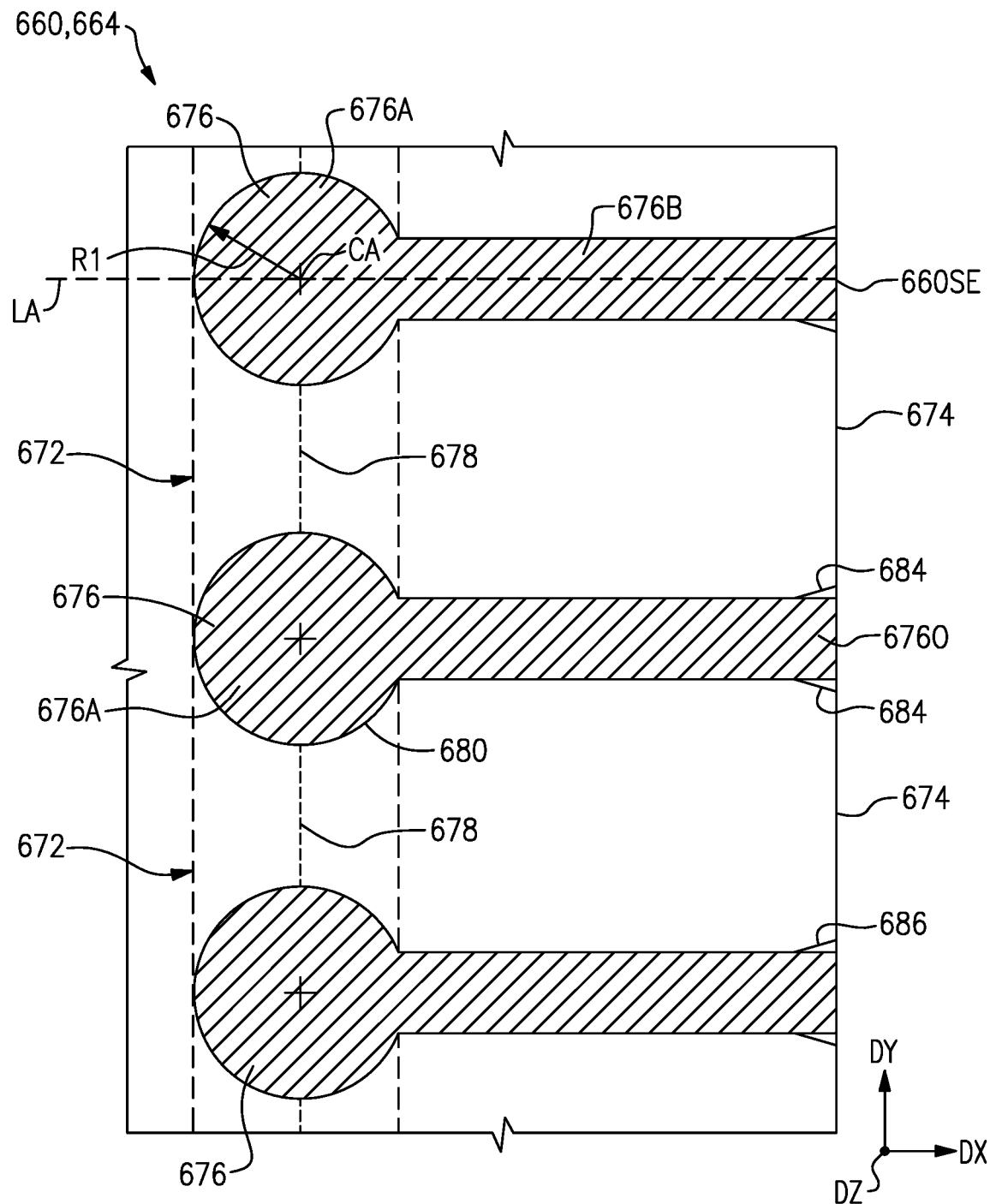
FIG. 19 illustrates a sectional view of a component including a cooling arrangement according to another example.

FIG. 19 illustrates an exemplary gas turbine engine component 660 including a cooling arrangement 664 according to another example. In the illustrated example of FIG. 19, a plurality of pedestals 676 are shown. Each pedestal 676 includes a first portion 676A and a second portion 676B that extends outwardly from the first portion 676A. In examples, the second portion 676B extends from the first portion 676A in a direction DX along a longitudinal axis LA to an external wall surface 660SE of the component 660. In examples, the first portion 676A can have a substantially elliptical or circular cross-sectional geometry established by a radius R1 swept about a central axis CA, which may reduce a thickness of the pedestal 676 and reduce weight. The second portion 676B can have a substantially rectangular geometry extending from a sidewall of the first portion 676A. A perimeter of the first portion 676B establishes a diffusion section 680 of the cooling passage 670.

Figure 20:
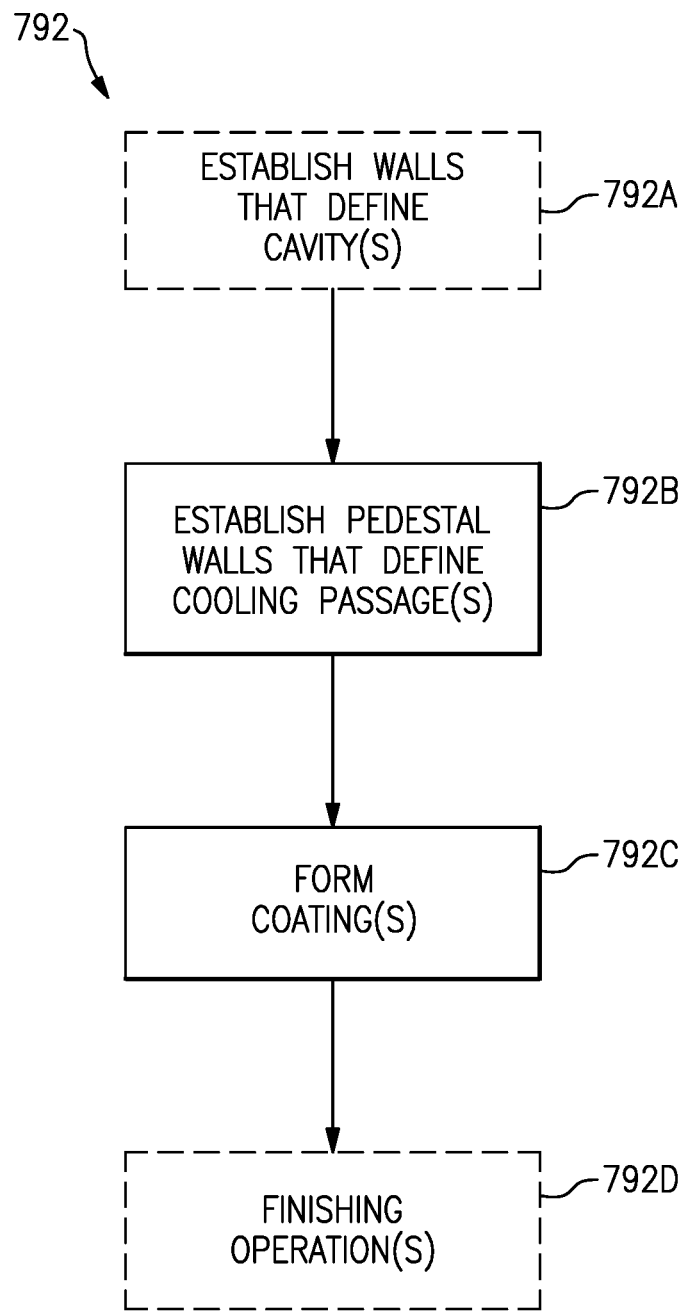
FIG. 20 illustrates an exemplary process for forming a component.

FIG. 20 illustrates an exemplary process in a flowchart 792 for fabricating a gas turbine engine component including any of the components disclosed herein. The component 160, 260 are referenced for illustrative purposes. Although only four steps 792A-792D are shown, it should be understand that fewer or more than four steps can be utilized, and each step 792A-792D may encompass more than one step. With reference to FIGS. 4 and 6, one or more cavities 168 can be established at step 792A. In other examples, step 792A is omitted. In examples, steps 792A and 792B occur simultaneously.

At step 792B, one or more cooling passages 170 of a cooling arrangement 164 fare established between adjacent transfer features or pedestals 176 in a wall, such as an external wall 162E of the component 160. The adjacent pedestals 176 can extend from the external wall surface 162SE of the external wall 162E to establish an outlet 174 of the cooling passage 170. The cooling passage 170 includes an inlet 172 coupled to the internal cavity 168. The adjacent pedestals 176 can be dimension such that the cooling passage 170 tapers inwardly from the inlet 172 in a first direction (e.g., direction X) towards the outlet 174 to establish a throat 178, as illustrated in FIG. 6. The pedestals 176 can be dimensioned such that the cooling passage 170 tapers outwardly from the throat 178 in the first direction towards the outlet 174 to establish a diffusion section 180 interconnecting the throat 178 and the outlet 174, as illustrated in FIG. 6.

A casting core can be utilized in steps 792A and 792B to establish the cooling arrangement, such as the core 390 of FIG. 11. RMC cores may be utilized to form the cooling arrangements 164, 264, and ceramic cores may be utilized to form the cooling arrangements 464, 564, for example.

At step 792C, one or more coatings 284, 284' can be formed along a surface of the wall of the component 260 and into the outlet 274 to establish a coated outlet region 286 of the respective cooling passage 270, as illustrated by the cooling arrangement 264 of FIG. 7. The disclosed cooling arrangements can be utilized to reduce a likelihood of metering at the coated outlet region 286 due to partial blockage. One or more finishing operations can be performed at step 792D. Exemplary finishing operations can include machining or treating surfaces of the component, for example. Some intermittent finishing operations may also be performed between steps 792A and 792B, while others may be executed after step 792B and before step 792C.

The disclosed cooling arrangements can be utilized to provide sufficient structural support in combination with sufficient film cooling coverage to counteract high heat loads in the component during operation. The disclosed cooling arrangements can provide relatively higher film effectiveness and reduced mixing loses that may be otherwise caused by gaspath velocities being much higher than cooling flow ejected by the outlets, and can reduce variability in cooling augmentation between the adjacent cooling passages that may otherwise be caused due to variation in coating thickness. Flow separation can be reduced, including for rotating airfoils or blades which may have radial variability due to centrifugal forces caused by rotation. The throat dimensioning can be set to relatively tight tolerances which can reduce variability in cooling augmentation across the airfoils in a respective array or row, which can improve efficiency of the engine. The disclosed cooling arrangements can be utilized to provide lower material temperatures, lower thru-thickness gradients, lower transient thermal gradients, and improved durability, and may be produced at a relatively lower cost.

It should be understood that relative positional terms such as "forward," "aft," "upper," "lower," "above," "below," and the like are with reference to the normal operational altitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil for a gas turbine engine comprising:
an airfoil section extending in a radial direction from a platform section, extending in a chordwise direction between a leading edge and a trailing edge, and extending in a thickness direction between a pressure side and a suction side that join together at the leading and trailing edges;
wherein at least one of the airfoil section and the platform section include a wall, the wall extending between an internal wall surface and an external wall surface, and the internal wall surface bounding an internal cavity;
wherein the wall includes a plurality of pedestals having adjacent pedestals extending from the external wall surface to establish a respective cooling passage, and the cooling passage includes an inlet and an outlet, the inlet coupled to the internal cavity along the internal wall surface, and the outlet along the external wall surface;
wherein the adjacent pedestals are dimensioned such that the adjacent pedestals taper inwardly from the inlet in a first direction towards the outlet to establish a throat in the respective cooling passage, and the respective passage expands outwardly from the throat in the first direction towards the outlet to establish a diffusion section interconnecting the throat and the outlet; and
one or more coatings along the external wall surface and into the outlet to establish a coated outlet region of the cooling passage, wherein a minimum cross-sectional area of the cooling passage along the coated outlet region divided by a cross-sectional area of the throat establishes a coated area ratio, and the coated area ratio is greater than or equal to 0.8.

2. The airfoil as recited in claim 1, wherein each of the adjacent pedestals comprises a ceramic or metallic material, and the one or more coatings comprise a ceramic and/or a metallic material.

3. The airfoil as recited in claim 1, wherein the outlet is established adjacent to the trailing edge.

4. The airfoil as recited in claim 3, wherein no other pedestals are situated between facing walls of the adjacent pedestals bounding the cooling passage at the throat.

5. The airfoil as recited in claim 1, wherein facing walls of the adjacent pedestals are substantially parallel along a first length of the cooling passage between the throat and the diffusion section and are substantially parallel along a second length of the cooling passage between the diffusion section and the outlet.

6. The airfoil as recited in claim 5, wherein the coated area ratio is less than or equal to 1.3.

7. The airfoil as recited in claim 5, wherein each of the adjacent pedestals extends along a respective longitudinal axis, the longitudinal axes of the adjacent pedestals establish a pitch, the adjacent pedestals establish a first width across the throat, and wherein a ratio of the first width to the pitch is greater than or equal to 0.25 and is less than or equal to 0.65.

8. The airfoil as recited in claim 5, wherein:
each of the adjacent pedestals extends along a respective longitudinal axis and along a respective reference plane bisecting the adjacent pedestals along the respective longitudinal axis;
a first cross-sectional area is established along the external wall surface at the outlet of the respective cooling passage, and the first cross-sectional area defined between the reference planes of the adjacent pedestals and between opposed faces bounding the respective cooling passage spanning between facing walls of the adjacent pedestals; and
one minus a ratio of a cross-sectional area of the coated outlet region along the outlet of the respective cooling passage divided by the first cross-sectional area defines a blockage ratio, and the blockage ratio is greater than or equal to 0.35.

9. The airfoil as recited in claim 8, wherein the coated area ratio is greater than or equal to 0.9 and less than or equal to 1.15.

10. The airfoil as recited in claim 1, wherein:
opposed faces of the wall extend between the adjacent pedestals to bound the cooling passage, and the opposed faces establishing a first height at the outlet;
a ratio of an average thickness of the one or more coatings along the opposed faces at the outlet divided by the first height is less than or equal to 0.20.

11. The airfoil as recited in claim 1, wherein the facing walls of the adjacent pedestals are filleted along at least a portion of the cooling passage between the inlet and outlet.

12. A gas turbine engine comprising:
an array of blades and an array of vanes spaced axially from the array of blades in a gas path, the array of blades are rotatable in the gas path, and an array of blade outer air seals (BOAS) arranged about the array of blades to bound the gas path; and
wherein at least one of the array of blades, the array of vanes and the array of BOAS comprises:
an external wall between an internal wall surface and an external wall surface, the internal wall surface bounding an internal cavity;

wherein a plurality of pedestals are established in a thickness of the external wall, the plurality of pedestals including pairs of adjacent pedestals extending from the external wall surface to establish respective cooling passages, and each of the cooling passages includes an inlet and an outlet, the inlet coupled to the internal cavity along the internal wall surface, and the outlet along the external wall surface;

wherein the adjacent pedestals are dimensioned such that the respective cooling passage establishes a throat and a diffusion section interconnecting the throat and the outlet; and one or more coatings along the external wall surface and into the outlet to establish a coated outlet region of the respective cooling passage, wherein a minimum cross-sectional area of the respective cooling passage along the coated outlet region divided by a cross-sectional area of the throat establishes a coated area ratio, and the coated area ratio is greater than or equal to 0.8.

13. The gas turbine engine as recited in claim 12, wherein the one or more coatings comprise a ceramic and/or metallic material.

14. The gas turbine engine as recited in claim 12, wherein an airfoil section comprises the external wall, the airfoil section extending in a thickness direction between pressure and suction sides and extending in a chordwise direction between leading and trailing edges, the outlet is established along the trailing edge.

15. The gas turbine engine as recited in claim 12, wherein:
the adjacent pedestals are dimensioned such that the respective cooling passage tapers inwardly from the inlet towards the outlet to establish the throat;
facing walls of the adjacent pedestals are substantially parallel along a first length of the respective cooling passage between the throat and the diffusion section and are substantially parallel along the coated outlet region; and
the coated area ratio is less than or equal to 1.3.

16. The gas turbine engine as recited in claim 15, wherein:
no other pedestals are situated between the facing walls of the adjacent pedestals bounding the cooling passage at the throat; and
each of the adjacent pedestals extends along a respective longitudinal axis, the longitudinal axes of the adjacent pedestals establish a pitch, the adjacent pedestals establish a first width across the throat, and wherein a ratio of the first width to the pitch is greater than or equal to 0.25 and is less than or equal to 0.65.

17. A method of fabricating a gas turbine engine component comprising:
establishing an internal cooling cavity bounded by an external wall;
establishing a cooling passage between adjacent pedestals in the external wall, the adjacent pedestals extending from an external wall surface of the external wall to establish an outlet of the cooling passage, and the cooling passage including an inlet coupled to the internal cavity;
wherein the adjacent pedestals are dimensioned such that the cooling passage tapers inwardly from the inlet in a first direction towards the outlet to establish a throat, and expands outwardly from the throat in the first direction towards the outlet to establish a diffusion section interconnecting the throat and the outlet; and
forming one or more coatings along the external wall surface and into the outlet to establish a coated outlet region of the cooling passage, wherein a minimum cross-sectional area of the cooling passage along the coated outlet region divided by a cross-sectional area of the throat establishes a coated area ratio, and the coated area ratio is greater than or equal to 0.8 and is less than or equal to 1.3.

18. The method as recited in claim 17, wherein the one or more coatings comprise a ceramic and/or metallic material.

19. The method as recited in claim 17, wherein:
the gas turbine engine component is an airfoil including an airfoil section extending in a radial direction from a platform section, extending in a chordwise direction between a leading edge and a trailing edge, and extending in a thickness direction between a pressure side and a suction side that join together at the leading and trailing edges; and
the outlet is established along the trailing edge.

20. The method as recited in claim 19, wherein:
no other pedestals are situated between facing walls of the adjacent pedestals bounding the cooling passage at the throat;
the facing walls of the adjacent pedestals are substantially parallel along a first length of the cooling passage between the throat and the diffusion section and are substantially parallel along the coated outlet region.

* * * * *